United States Patent
Kuo

(10) Patent No.: US 9,151,928 B2
(45) Date of Patent: Oct. 6, 2015

(54) DEVICE FOR ASSEMBLING MOVEABLE CARRIER OF CAMERA ACTUATOR

(71) Applicant: HON HAI PRECISION INDUSTRY CO., LTD., New Taipei (TW)

(72) Inventor: Chang-Wei Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 153 days.

(21) Appl. No.: 13/931,489

(22) Filed: Jun. 28, 2013

(65) Prior Publication Data

US 2014/0201984 A1     Jul. 24, 2014

(51) Int. Cl.
| B23P 19/00 | (2006.01) |
| B23Q 3/00 | (2006.01) |
| G02B 7/08 | (2006.01) |
| G02B 7/00 | (2006.01) |
| G03B 3/10 | (2006.01) |

(52) U.S. Cl.
CPC . *G02B 7/08* (2013.01); *G02B 7/003* (2013.01); *G03B 3/10* (2013.01); *G03B 2205/0053* (2013.01); *Y10T 29/49895* (2015.01); *Y10T 29/49998* (2015.01); *Y10T 29/53* (2015.01); *Y10T 29/53913* (2015.01)

(58) Field of Classification Search
CPC .................. Y10T 29/49895; Y10T 29/49904; Y10T 29/53909; Y10T 29/49998; Y10T 29/53913; Y10T 29/53943; Y10T 29/53961; G02B 7/003; G02B 7/004; B23Q 16/001; B23Q 3/00; B23Q 3/005; B25B 11/02; B25B 11/00

USPC ................ 269/13, 7, 37, 40, 43, 44
See application file for complete search history.

(56) References Cited

U.S. PATENT DOCUMENTS

| 3,281,167 | A | * | 10/1966 | Hansen ........................... 403/81 |
| 5,077,880 | A | * | 1/1992 | Dean et al. .................... 29/281.5 |
| 8,650,746 | B2 | * | 2/2014 | Wang .............................. 29/790 |
| 8,963,979 | B2 | * | 2/2015 | Tajima et al. ................. 347/242 |
| 2009/0282673 | A1 | * | 11/2009 | Huang et al. .................... 29/700 |
| 2012/0013033 | A1 | * | 1/2012 | Adachi et al. ................... 264/35 |
| 2012/0291265 | A1 | * | 11/2012 | Chen et al. ....................... 29/700 |
| 2012/0291266 | A1 | * | 11/2012 | Chen et al. ....................... 29/700 |
| 2013/0061446 | A1 | * | 3/2013 | Wang .............................. 29/428 |
| 2013/0120599 | A1 | * | 5/2013 | Chen et al. ................. 348/208.2 |
| 2013/0133186 | A1 | * | 5/2013 | Lai ................................... 29/700 |
| 2013/0208172 | A1 | * | 8/2013 | Tashiro et al. ................ 348/340 |
| 2014/0199059 | A1 | * | 7/2014 | Kuo ............................... 396/428 |

* cited by examiner

*Primary Examiner* — Essama Omgba
(74) *Attorney, Agent, or Firm* — Novak Druce Connolly Bove + Quigg LLP

(57) ABSTRACT

An assembling device includes: a base, a first pressing plate, a second pressing plate and an ejecting unit. The base defines an accommodating portion which includes a top surface, a bottom surface and a side surface. The top surface defines a plurality of receiving grooves for receiving the moveable frames, the side surface defines a plurality of first through holes, the bottom surface defines a plurality of second through holes, the first through holes and the second through holes are communicated with the receiving grooves. The first pressing plate is configured for assembling a shaft on a first surface of the moveable frame. The second pressing plate is arranged on the side surface and being configured for assembling a magnet on a second surface of the moveable frame. The ejecting unit includes a plurality of ejectors, and configured for ejecting the movable frames in the receiving grooves.

14 Claims, 8 Drawing Sheets

DEVICE FOR ASSEMBLING MOVEABLE CARRIER OF CAMERA ACTUATOR

BACKGROUND

1. Technical Field

The present disclosure relates to a device for assembling moveable carrier of camera actuator.

2. Description of Related Art

An actuator moves lenses along an optical axis in a camera module during an auto-focus function. The camera actuator includes a moveable carrier, a Hall sensor magnet arranged on one side of the moveable carrier, a shaft arranged on another side of the moveable carrier. When assembling, the shaft and the Hall sensor magnet are assembled at two different work stations, which is a waste of human resources and time.

Therefore, it is desired to provide an assembling device and a related assembling method which can overcome the above mentioned problems.

DETAILED DESCRIPTION

Figure 1:
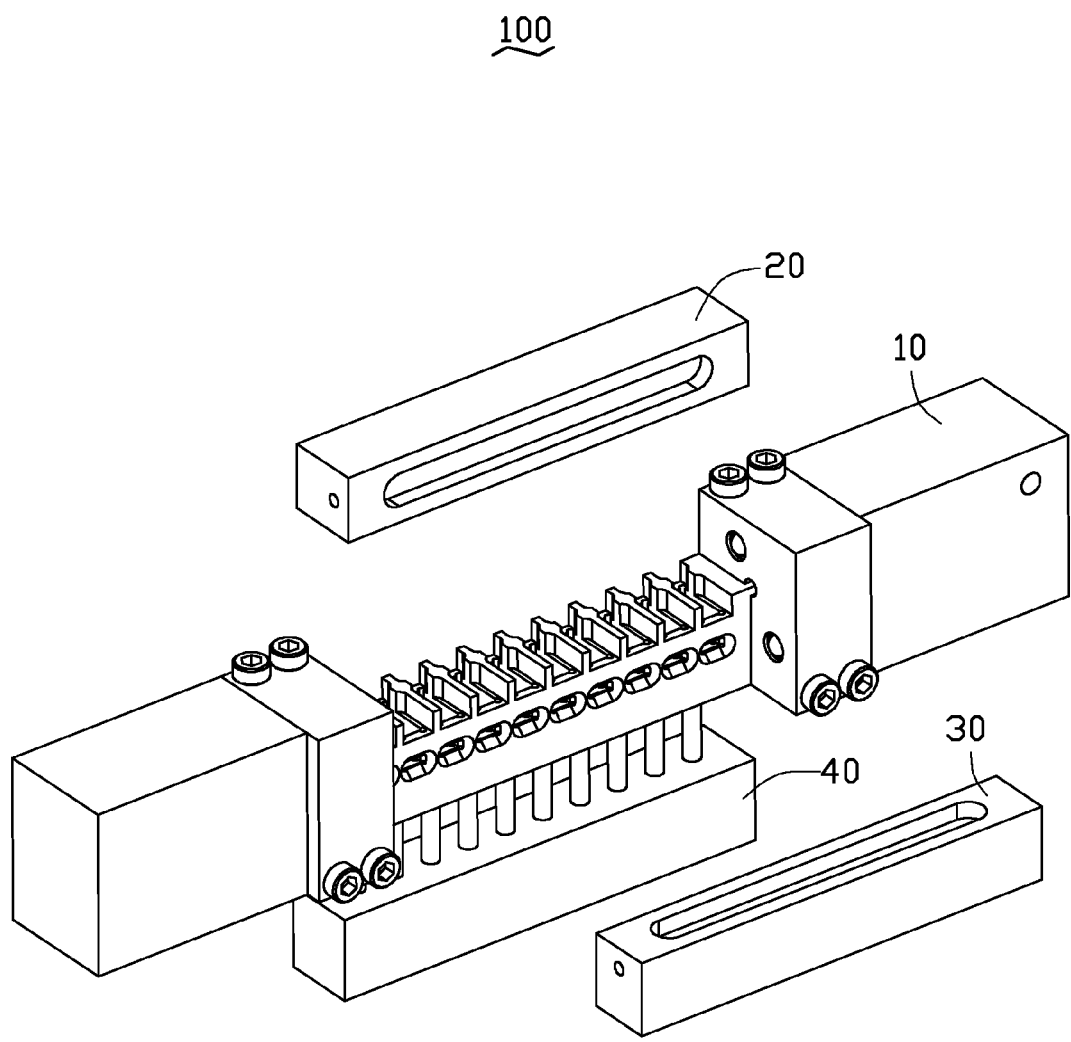
FIG. 1 is a schematic view of an device for assembling a moveable frame of an actuator according to an exemplary embodiment.
Figure 2:
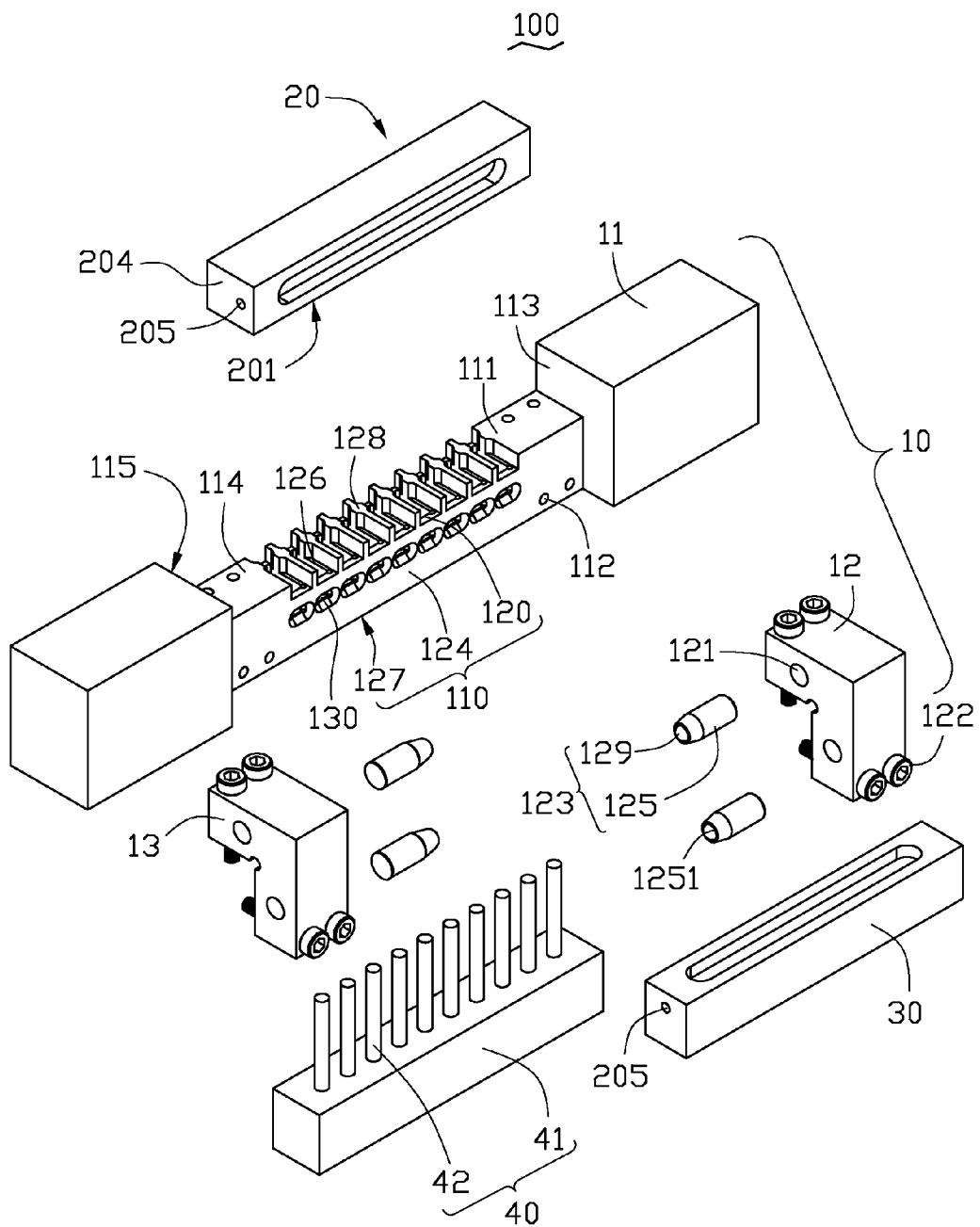
FIG. 2 is an exploded view of the device of FIG. 1.
Figure 3:
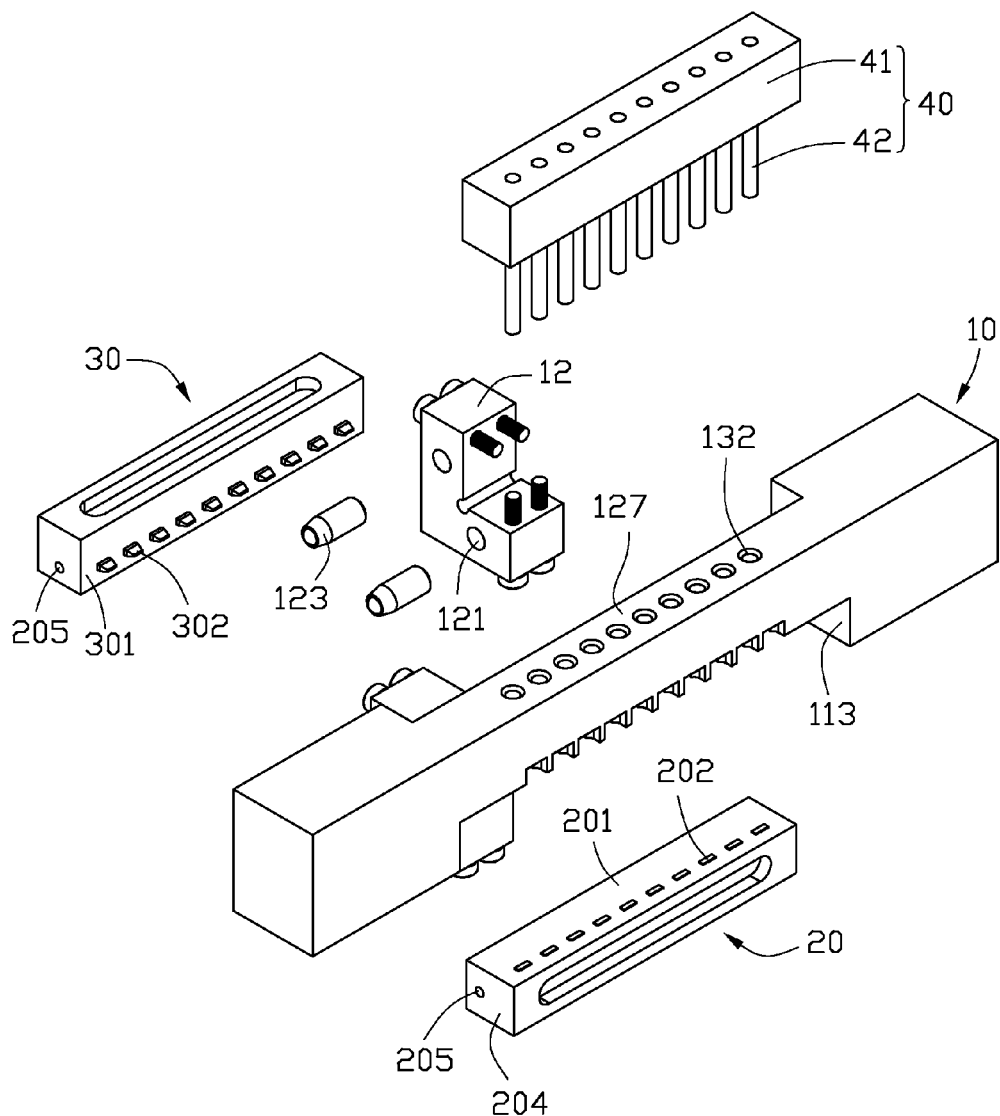
FIG. 3 is similar to FIG. 2, but viewed from another aspect.
Figure 4:
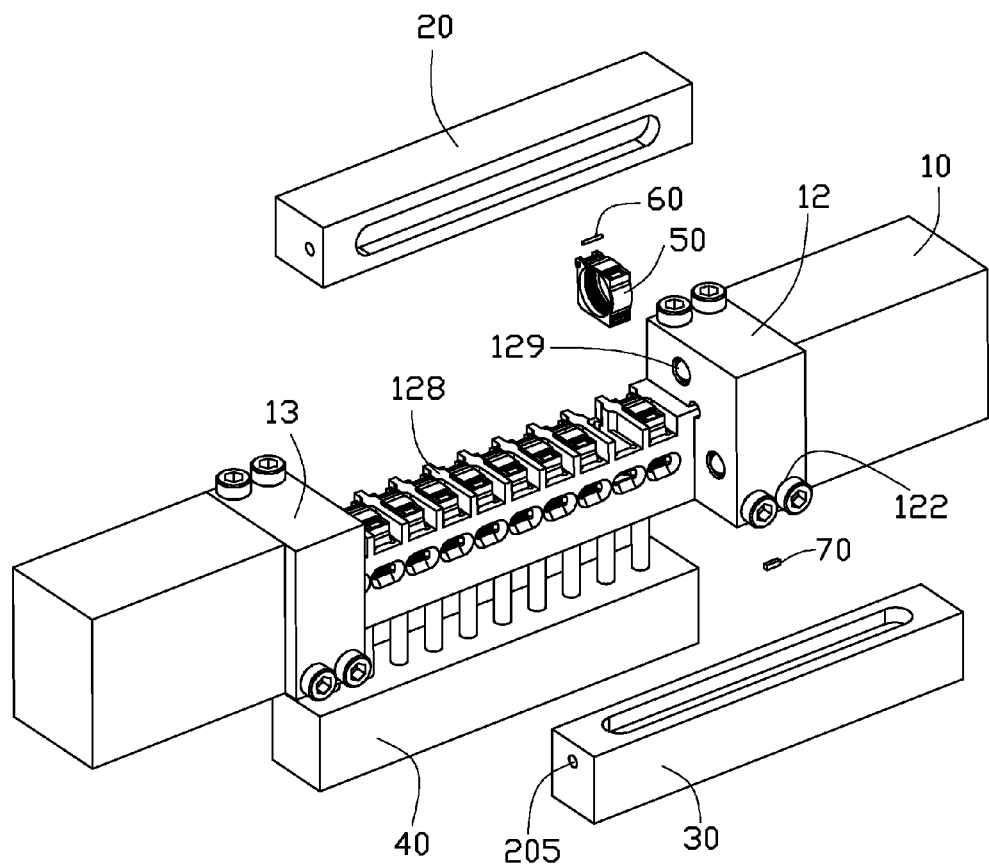
FIG. 4 is a schematic view showing an assembling state of a moveable carrier using the device of FIG. 1.
Figure 5:
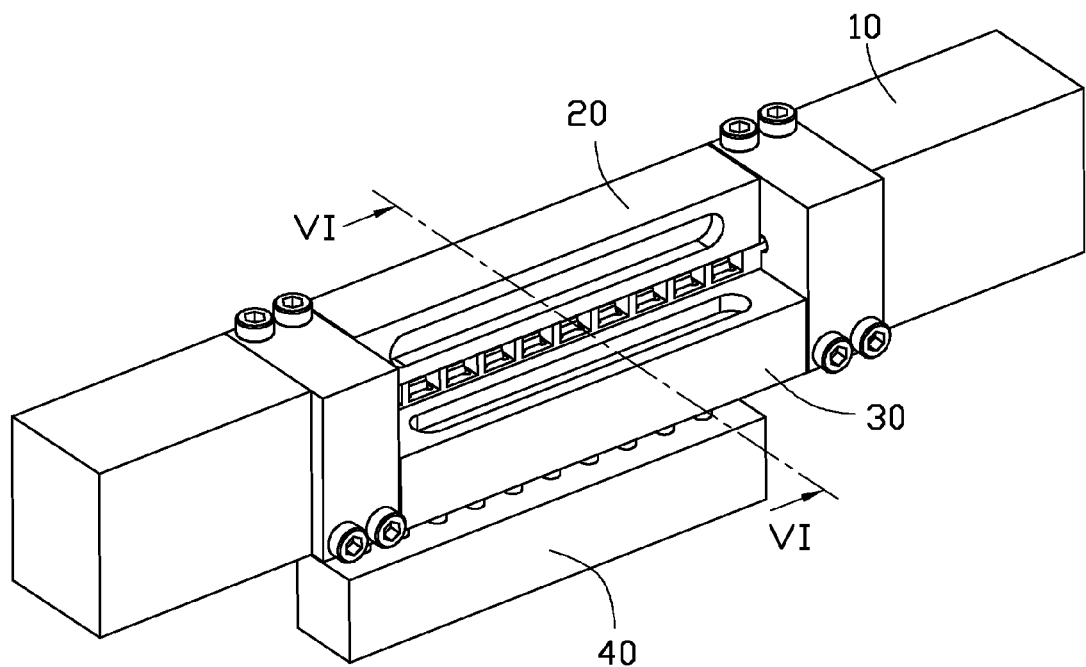
FIG. 5 is another schematic view showing an assembling state of the moveable carrier using the device of FIG. 1.
Figure 6:
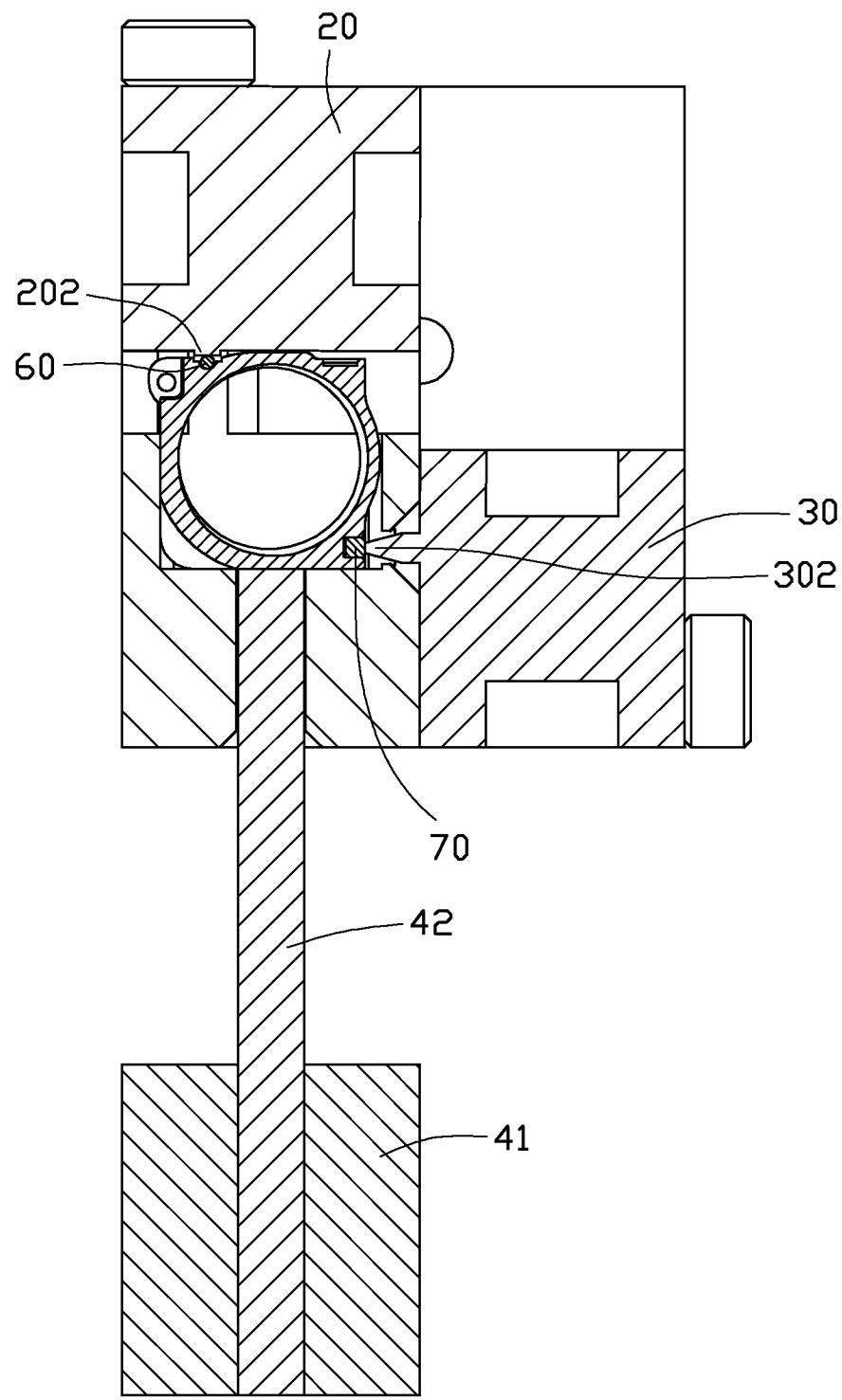
FIG. 6 is a cross-sectional view taken along the line V-V of FIG. 5.
Figure 7:
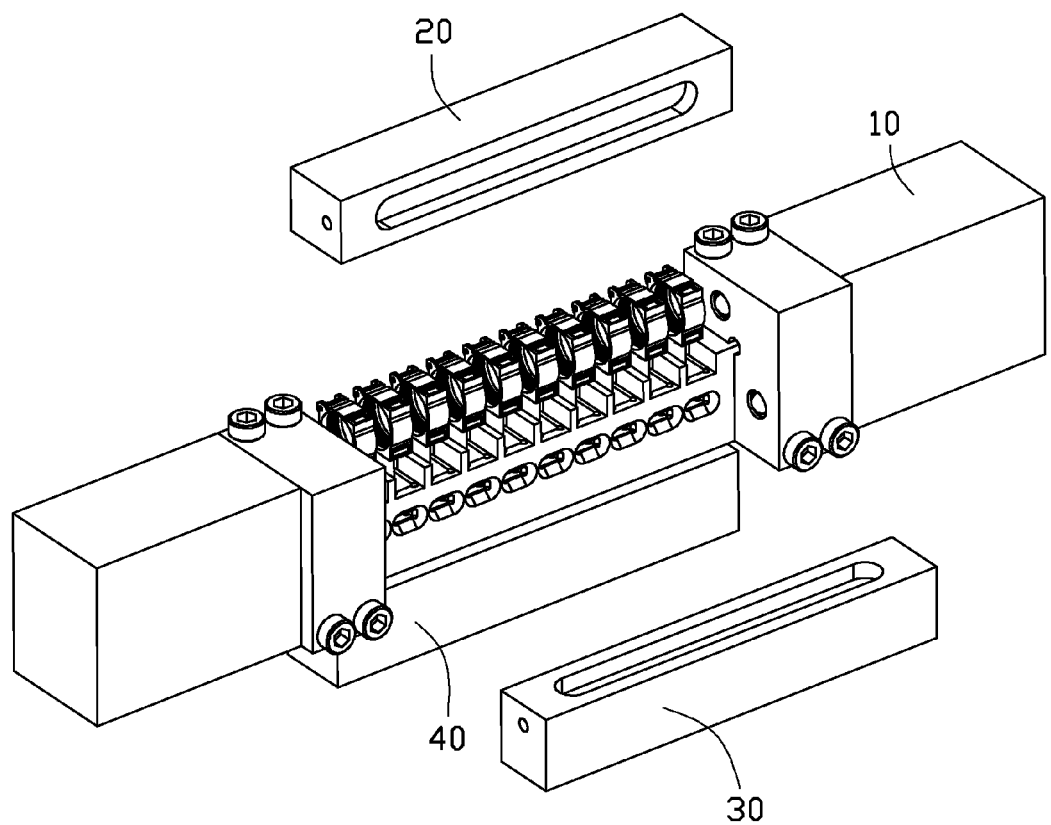
FIG. 7 is another schematic view showing an assembling state of the moveable carrier using the device of FIG. 1.

FIGS. 1-5 show an device 100 for assembling moveable carriers of camera actuators according to an exemplary embodiment. The device 100 includes a base 10, a first pressing plate 20, a second pressing plate 30 and an ejection unit 40.

The base 10 includes a pedestal 11, a first support 12 and a second support 13. The pedestal 11 includes a first side plate 113, a first mounting portion 111, an accommodating portion 110, a second mounting portion 114 and a second side plate 115 in order along the lengthwise direction of the pedestal 11. In other words, the accommodating portion 110 is between the first mounting portion 111 and the second mounting portion 114. The first side plate 113 is connected at a terminal end of the first mounting portion 111, and the second side plate 115 is connected at a terminal end of the second mounting portion 114. In this embodiment, the first side plate 113, the first mounting portion 111, the accommodating portion 110, the second mounting portion 114 and the second side plate 115 are unitarily formed.

The first support 12 and the second support 13 are substantially L shaped. The first support 12 is attached on the first mounting portion 111, and the second support 13 is attached on the second mounting portion 114. The first mounting portion 111 defines four screw holes 112. Four bolts 122 extending through the first support 12 are inserted into the screw holes 112 to fix the first support 12 on the first mounting portion 111. The second mounting portion 13 defines four screw holes 112. Four bolts 122 extending through the second support 13 are inserted into the screw holes 112 to fix the second support 13 on the second mounting portion 114.

The accommodating portion 110 includes a top surface 120, a bottom surface 127 and a side surface 124 connecting the top surface 120 and the bottom surface 127. The top surface 120 defines a number of receiving grooves 126 extending along a direction perpendicular to the top surface 120. Each of the receiving grooves 126 is configured for receiving a corresponding moveable carrier 50. The side surface 124 defines a number of first through holes 130. The bottom surface 127 defines a number of second through holes 132. The first through holes 130, the second through holes 132 and the receiving grooves 126 correspond with each other. Both the first through holes 130 and the second through holes 132 communicate with the receiving grooves 126. The pedestal 11 further includes a number of spacers 128. The receiving groove 126 is located between each two adjacent spacers 128.

The first pressing plate 20 is detachably connected with the base 10 and is located on the top surface 120. In the embodiment, the first pressing plate 20 includes two opposite end surfaces 204. Each of the end surfaces 204 defines a receiving hole 205. The base 10 further includes dowel pins 123. The dowel pins 123 include a tube 125 and a ball 129 arranged at a distal end of the tube. Specifically, the tube 125 configured for receiving the ball 129 and the ball 129 is partially exposed from the tube. A first side surface of the first support 12 away from the first side plate 113 defines two pin holes 121, and a second side surface of the second support 13 away from the second side plate 115 defines two additional pin holes 121. The dowel pins 123 are arranged in the pin holes 121. The receiving hole 205 is matched with the ball 129 of the dowel pin 123, and the first pressing plate 20 is connected with the base 10 via the ball 129 of the dowel pin 123 received in the receiving hole 205.

Figure 8:
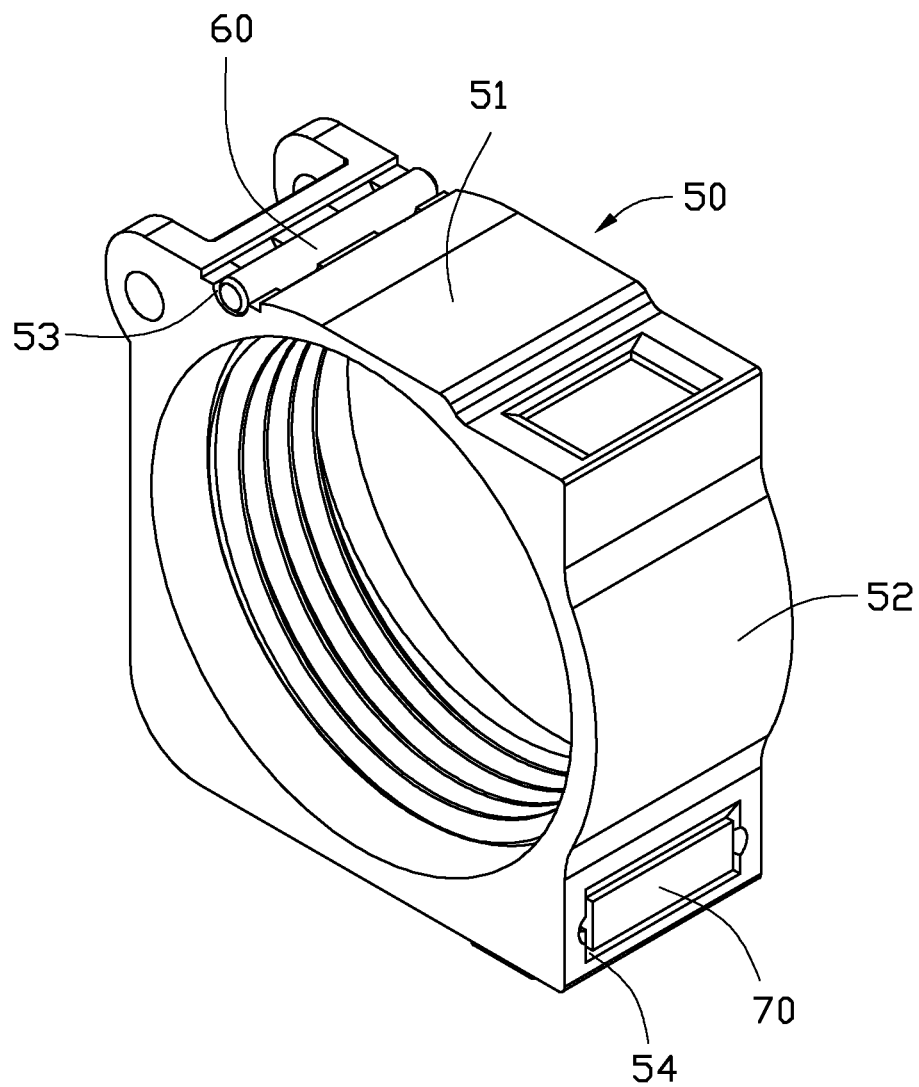
FIG. 8 is a schematic view showing the moveable carrier being assembled.

The first pressing plate 20 includes a first pressing surface 201 and a number of first projections 202 formed on the first pressing surface 201. The first projections 202 are substantially cuboids and aligned with the respective receiving grooves 126. The first pressing plate 20 is configured for assembling shafts 60 on a first side 51 of each moveable carriers 50 (see FIG. 8).

The second pressing plate 30 is also detachably connected with the base 10 and bears the side surface 124. The connection configurations between the second pressing plate 30 and the base 10 is substantially the same as the connection configurations between the first pressing plate 20 and the base 10. The second pressing plate 30 includes a second pressing surface 301 and a number of second projections 302 formed on the second pressing surface 301. The second projections 302 are tapered and aligned with the respective first through holes 130. The second pressing plate 30 is configured for pressing a Hall sensor magnet 70 on a second surface 52 of the moveable carrier 50 through the first through holes 130 (see FIG. 8).

The ejecting unit 40 includes a substrate 41 and a number of ejecting posts 42 connecting with the substrate 41. Each of the ejecting post 42 aligned with the corresponding receiving groove 126, and is configured for ejecting the movable carrier 50 out of the receiving groove 126 by inserting the ejecting post 42 into the second through holes 132.

FIGS. 4-8 show an assembling method for assembling a moveable carrier of an actuator using the device 100, which includes the following steps.

Step 1: The device 100, moveable carriers 50, shafts 60 and Hall sensor magnets 70 are provided. Each moveable carriers 50 includes a four-sided frame, and the moveable carriers 50 includes a first side 51 of the frame for receiving the shaft 60 and a second neighboring side 52 of the frame for receiving a Hall sensor magnet 70.

Step 2: The first pressing plate 20, the second pressing plate 32 and the ejecting unit 40 are detached from the base 10.

Step 3: The moveable carriers 50 are placed in the receiving grooves 126. In the embodiment, the device 100 is placed on a platform (not shown), with the top surface 120 parallel to the platform, and then each moveable carriers 50 is placed into the corresponding receiving groove 126 with the second surface 52 facing the first through hole 130.

Step 4: Glue is dispensed in a shaft mounting area 53 of the first side 51 and then the shafts 60 are placed in the shaft mounting areas 53. The first pressing plate 20 is fixed to the base 10 and the first projections 203 press the shafts 60 to fix the shafts 60 in the shaft mounting areas 53.

Step 5: The assembling device 100 is turned at 90 degrees to make the side surface 124 face upwardly and glue is dispensed in a Hall sensor magnet mounting area 54 of the second surface 52, and then the Hall sensor magnet 70 are placed in the Hall sensor magnet mounting area 54. The second pressing plate 30 is fixed to the base 10 and the second projections 302 press the Hall sensor magnets 70 to fix the Hall sensor magnets 70 in the Hall sensor magnet mounting areas 54.

Step 6: Glue in the shaft mounting areas 53 and in the Hall sensor magnet mounting areas 54 are solidified.

Step 7: The movable carriers 50 with the shafts 60 and the Hall sensor magnets 70 located in the receiving grooves 126 are pushed out by the ejecting posts 42 inserted into the second through holes 132. In this way, the shafts 60 and the Hall sensor magnets 70 are receivingly engaged in the movable carriers 50. In this embodiment, the shafts 60 and the Hall sensor magnets 70 are receivingly engaged in the moveable frames 50 at only one work station. It can save human resources and time.

It is to be understood, however, that even though numerous characteristics and advantages of the present embodiments have been set forth in the foregoing description, together with details of the structures and functions of the embodiments, the disclosure is illustrative only, and changes may be made in detail, especially in the matters of shape, size, and arrangement of portion within the principles of the disclosure to the full extent indicated by the broad general meaning of the terms in which the appended claims are expressed.

What is claimed is:

1. A device for assembling moveable carriers of camera actuators, each moveable carrier including a four-sided frame, a shaft receivingly engaged in a first side of the frame and a Hall sensor magnet receivingly engaged in a second neighboring side of the frame, the assembling device comprising:
    a base including an accommodating portion, the accommodating portion comprising a top surface, a bottom surface and a side surface connecting the top surface and the bottom surface, the top surface defines a plurality of receiving grooves, each of the receiving grooves being configured for receiving a corresponding moveable frame with a first side thereof exposed at the respective receiving groove, the side surface defining a plurality of first through holes for exposed second sides of the moveable frames, the bottom surface defining a plurality of second through holes, the first through holes and the second through holes communicating with the respective receiving grooves;
    a first pressing plate arranged on the top surface, and the first pressing plate being configured for pressing a shaft into the exposed first side of each moveable frame;
    a second pressing plate arranged on the side surface, the second pressing plate being configured for pressing a Hall sensor magnet into the exposed second side of each moveable frame;
    an ejecting unit comprising a substrate and a plurality of ejecting posts connected with the substrate, each of the ejecting posts aligned with the corresponding receiving groove, and configured for ejecting the moveable carrier out of the receiving groove.

2. The device of claim 1, wherein the base includes a pedestal, a first support and a second support, the first support and the second support are L shaped and the pedestal comprises a first mounting portion and a second mounting portion, the accommodating portion is located between the first mounting portion and the second mounting portion, the first support attached on the first mounting portion and the second mounting support attached on the second mounting portion.

3. The device of claim 2, wherein the pedestal further comprises a first side plate and a second side plate, the first side plate is connected to a distal end of the first mounting portion, the second side plate is connected to a distal end of the second mounting portion.

4. The device of claim 3, wherein the first side plate, the first mounting portion, the accommodating portion, the second mounting portion and the second side plate are unitarily formed.

5. The device of claim 3, further comprising a plurality of dowel pins, each of the dowel pins comprising a tube and a ball arranged at a distal end of the tube, the tube configured for receiving the ball and the ball is exposed from the tube.

6. The device of claim 5, wherein the first support defines a plurality of first pin holes, and the second support defines a plurality of second pin holes, the first pin holes and the second pin holes are configured for receiving the dowel pins.

7. The device of claim 6, wherein the first pressing plate and the second pressing plate comprise a plurality of receiving holes, the receiving holes receive the balls of the dowel pins to connect the first pressing plate and the second pressing plate with the base.

8. The device of claim 2, wherein the pedestal further comprises a plurality of spacers, each of the receiving grooves is located between two adjacent spacers.

9. The device of claim 2, wherein the first mounting portion defines a plurality of screw holes, the assembling device further comprises a plurality of bolts extending through the first support and being inserted into the screw holes to fix the first support on the first mounting portion.

10. The device of claim 1, wherein the first pressing plate comprises a first pressing surface and a plurality of first projections formed on the first pressing surface.

11. The device of claim 10, wherein the first projections are aligned with the respective receiving grooves.

12. The device of claim 1, wherein the second pressing plate comprises a second pressing surface and a plurality of second projections formed on the second pressing surface.

13. The device of claim 12, wherein the second projections are aligned with the respective first through holes.

14. The device of claim 1, wherein the second mounting portion defines a plurality of screw holes, the assembling device further comprises a plurality of bolts extending through the second support and being inserted into the screw holes to fix the second support on the second mounting portion.

* * * * *